United States Patent
Matsuno et al.

(10) Patent No.: US 10,000,229 B2
(45) Date of Patent: Jun. 19, 2018

(54) STEERING COLUMN DEVICE

(71) Applicant: FUJI KIKO CO., LTD., Kosai-shi, Shizuoka (JP)

(72) Inventors: Mitsuyoshi Matsuno, Kosai (JP); Koji Sawamura, Kosai (JP); Masatoshi Sakamoto, Toyohashi (JP); Aya Shimada, Hamamatsu (JP); Reo Katakura, Hamamatsu (JP); Tadao Ito, Toyohashi (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 0 days. days.

(21) Appl. No.: 15/453,026

(22) Filed: Mar. 8, 2017

(65) Prior Publication Data

US 2017/0282960 A1 Oct. 5, 2017

(30) Foreign Application Priority Data

Mar. 31, 2016 (JP) .................. 2016-072578

(51) Int. Cl.
*B62D 1/189* (2006.01)
*B62D 1/184* (2006.01)
*B62D 1/19* (2006.01)

(52) U.S. Cl.
CPC ............ *B62D 1/189* (2013.01); *B62D 1/184* (2013.01); *B62D 1/195* (2013.01)

(58) Field of Classification Search
CPC combination set(s) only.
See application file for complete search history.

(56) References Cited

U.S. PATENT DOCUMENTS

| 6,139,057 A | 10/2000 | Olgren et al. | |
|---|---|---|---|
| 6,419,269 B1 | 7/2002 | Manwaring et al. | |
| 7,475,907 B2* | 1/2009 | Tinnin | B62D 1/184 280/775 |
| 7,484,430 B2* | 2/2009 | Schulz | B62D 1/184 280/777 |
| 7,533,594 B2* | 5/2009 | Menjak | B62D 1/184 280/775 |
| 7,685,903 B2 | 3/2010 | Streng et al. | |

(Continued)

FOREIGN PATENT DOCUMENTS

| JP | 2008-143396 A | 6/2008 |
|---|---|---|
| JP | 4567040 B2 | 10/2010 |
| KR | 10-2016-0017199 A | 2/2016 |

OTHER PUBLICATIONS

European Search Report, dated Aug. 29, 2017, 10 pages.

(Continued)

*Primary Examiner* — Nicole T Verley
(74) *Attorney, Agent, or Firm* — Foley & Lardner LLP

(57) ABSTRACT

A steering column device includes: a steering column; and a the telescopic guide mechanism including a second telescopic elongated hole formed in one of the lower wall portion of the tilt bracket and the bottom wall portion of the steering column, and a sliding guide member which is provided to the other of the lower wall portion of the tilt bracket and the bottom wall portion of the steering column which does not include the second telescopic elongated hole, whose a portion confronts the second telescopic elongated hole, and which elastically sandwiches an edge portion of the second telescopic elongated hole in the upward and downward directions.

5 Claims, 10 Drawing Sheets

(56) References Cited

U.S. PATENT DOCUMENTS

| | | | | |
|---|---|---|---|---|
| 7,914,043 B2* | 3/2011 | Olgren | B62D 1/184 | |
| | | | 280/775 | |
| 7,918,483 B2* | 4/2011 | Galehr | B62D 1/184 | |
| | | | 280/775 | |
| 7,954,852 B2 | 6/2011 | Ueno et al. | | |
| 8,408,089 B2* | 4/2013 | Oshita | B62D 1/195 | |
| | | | 280/775 | |
| 8,443,696 B2* | 5/2013 | Schnitzer | B62D 1/192 | |
| | | | 280/777 | |
| 8,522,639 B2* | 9/2013 | Hirooka | B62D 1/185 | |
| | | | 280/775 | |
| 8,671,795 B2* | 3/2014 | Ozsoylu | B62D 1/184 | |
| | | | 74/493 | |
| 8,714,047 B2* | 5/2014 | Yamamoto | B62D 1/184 | |
| | | | 280/779 | |
| 8,777,267 B2* | 7/2014 | Fevre | B62D 1/184 | |
| | | | 280/779 | |
| 8,887,596 B2* | 11/2014 | Uesaka | B62D 1/195 | |
| | | | 280/775 | |
| 8,955,883 B2* | 2/2015 | Nagase | B62D 1/18 | |
| | | | 280/775 | |
| 8,991,861 B1* | 3/2015 | Iwakawa | B62D 1/181 | |
| | | | 280/775 | |
| 9,415,793 B2* | 8/2016 | Kubota | B62D 1/184 | |
| 9,415,795 B2* | 8/2016 | Hagiwara | B62D 1/184 | |
| 9,415,796 B2* | 8/2016 | Hagiwara | B62D 1/184 | |
| 9,505,426 B2* | 11/2016 | Matsuno | B62D 1/187 | |
| 9,718,489 B2* | 8/2017 | Nash | B62D 1/184 | |
| 2006/0021460 A1 | 2/2006 | Schulz | | |
| 2006/0207379 A1 | 9/2006 | Riefe et al. | | |
| 2008/0023952 A1* | 1/2008 | Manwaring | B62D 1/195 | |
| | | | 280/777 | |
| 2008/0087129 A1* | 4/2008 | Kaneko | B62D 1/184 | |
| | | | 74/493 | |
| 2009/0066070 A1 | 3/2009 | Ueno et al. | | |
| 2016/0311459 A1* | 10/2016 | Takahashi | B62D 1/185 | |
| 2017/0282957 A1* | 10/2017 | Matsuno | B62D 1/187 | |

OTHER PUBLICATIONS

USPTO Notice of Allowance, U.S. Appl. No. 15/453,015, 10 pages.
U.S. Appl. No. 15/453,015, filed Mar. 8, 2017, Fuji Kiko Co., Ltd.

* cited by examiner

STEERING COLUMN DEVICE

BACKGROUND OF THE INVENTION

The present invention relates to a steering column device, and more specifically to a steering column device having a tilt adjustment function and a telescopic adjustment function for adjusting a position of a steering wheel.

U.S. Patent Application Publication No. 2009/066070 (corresponding to Japanese Patent No. 4567040) discloses a steering column device having a tilt adjustment function for adjusting a position of a steering wheel in upward and downward directions, and a telescopic adjustment function for adjusting the position of the steering wheel in forward and rearward directions.

In general, in the tilt adjustment function (mechanism), the steering column is supported to be swung in the upward and downward directions about a tilt hinge pin provided to a front end side of the vehicle. The steering column device includes a vehicle body mounting bracket which is disposed to bridge the steering column, and which has side walls. The side walls of the vehicle body mounting bracket include tile elongated holes through which a bolt of a clamping device for lock/unlock at adjustment is inserted. The steering column device can perform the tilt adjustment in ranges of the elongated holes.

Moreover, in the telescopic adjustment function (mechanism), the steering column device includes a distance portion of the steering column. The distance portion includes a hole through which the bolt of the clamping device is inserted. This hole of the distance portion is an elongated hole extending parallel to an axis of the steering column. The steering column device can perform the telescopic adjustment in ranges of these elongated holes.

The steering column device of the above-described patent document includes a movable bracket and an intermediate bracket of the steering column which have, respectively, elongated holes of the telescopic adjustment. A lock shaft (lock bolt) is inserted into the elongated hole (telescopic adjustment hole) of the movable bracket. A connection shaft is inserted into the elongated hole (laterally elongated hole) of the middle bracket. With these, it is possible to perform the telescopic adjustment within the ranges of these elongated holes.

SUMMARY OF THE INVENTION

In the steering column device of the above-described patent document, the lock shaft side of the middle bracket is tightened and fixed between the side plates of the fixed bracket by the clamping mechanism after the tilt/telescopic adjustment. On the other hand, the connection shaft side of the middle bracket is not tightened and fixed even when the tilt/telescopic adjustment is not performed. Accordingly, a bush is disposed between the connection shaft and the middle bracket so as not to generate the wobble and the vibration.

However, even when the bush is disposed between the connection shaft and the laterally elongated hole of the middle bracket side, a gap is generated between the connection shaft and the laterally elongated hole of the middle bracket side, for allowing the relative movement at the telescopic adjustment. Moreover, this gap is generated in upward and downward directions which are identical to the tilt adjustment direction. Accordingly, the support rigidity is easy to be caused. Moreover, the vibration is easy to be generated.

It is, therefore, an object of the present invention to provide a steering column device which is devised to solve the above-described problems, to perform the telescopic adjustment by using telescopic elongated holes formed at front and rear portions, and to have a simple structure and a support rigidity so as to be hard to generate the vibration.

According to one aspect of the present invention, a steering column device comprises: a steering column; a vehicle body mounting bracket straddling the steering column; a tilt bracket which is rotatably supported through a tilt shaft on a front end portion of the vehicle body mounting bracket; the vehicle body mounting bracket including side walls which are formed at rear end portions of the vehicle body mounting bracket, and each of which includes a tilt elongated hole through which a cramping shaft of a lock mechanism is inserted, the steering column including a distance portion which is sandwiched between the side walls of the vehicle body mounting bracket, and which includes first telescopic elongated holes through which the clamping shaft is inserted, a lock mechanism which includes the clamping shaft, and which is arranged to lock or unlock a tilt operation and a telescopic operation of the steering column, the steering column including a bottom wall portion which is formed on a front side of the first telescopic elongated hole, and which confronts a lower wall portion of the tilt bracket, a telescopic guide s mechanism disposed between the lower wall portion of the tilt bracket and the bottom wall portion of the steering column, the telescopic guide mechanism including a second telescopic elongated hole formed in one of the lower wall portion of the tilt bracket and the bottom wall portion of the steering column, and a sliding guide member which is provided to the other of the lower wall portion of the tilt bracket and the bottom wall portion of the steering column which does not include the second telescopic elongated hole, whose a portion confronts the second telescopic elongated hole, and which elastically sandwiches an edge portion of the second telescopic elongated hole in the upward and downward directions.

BRIEF DESCRIPTION OF THE DRAWINGS

FIG. 8A is a plan view. FIG. 8B is a front view of FIG. 8A. FIG. 8C is a left side view of FIG. 8B.

DETAILED DESCRIPTION OF THE INVENTION

FIGS. 1 to 10 shows a steering column device according to a first embodiment of the present invention, which is arranged to perform a tilt operation and a telescopic operation.

Figure 1:
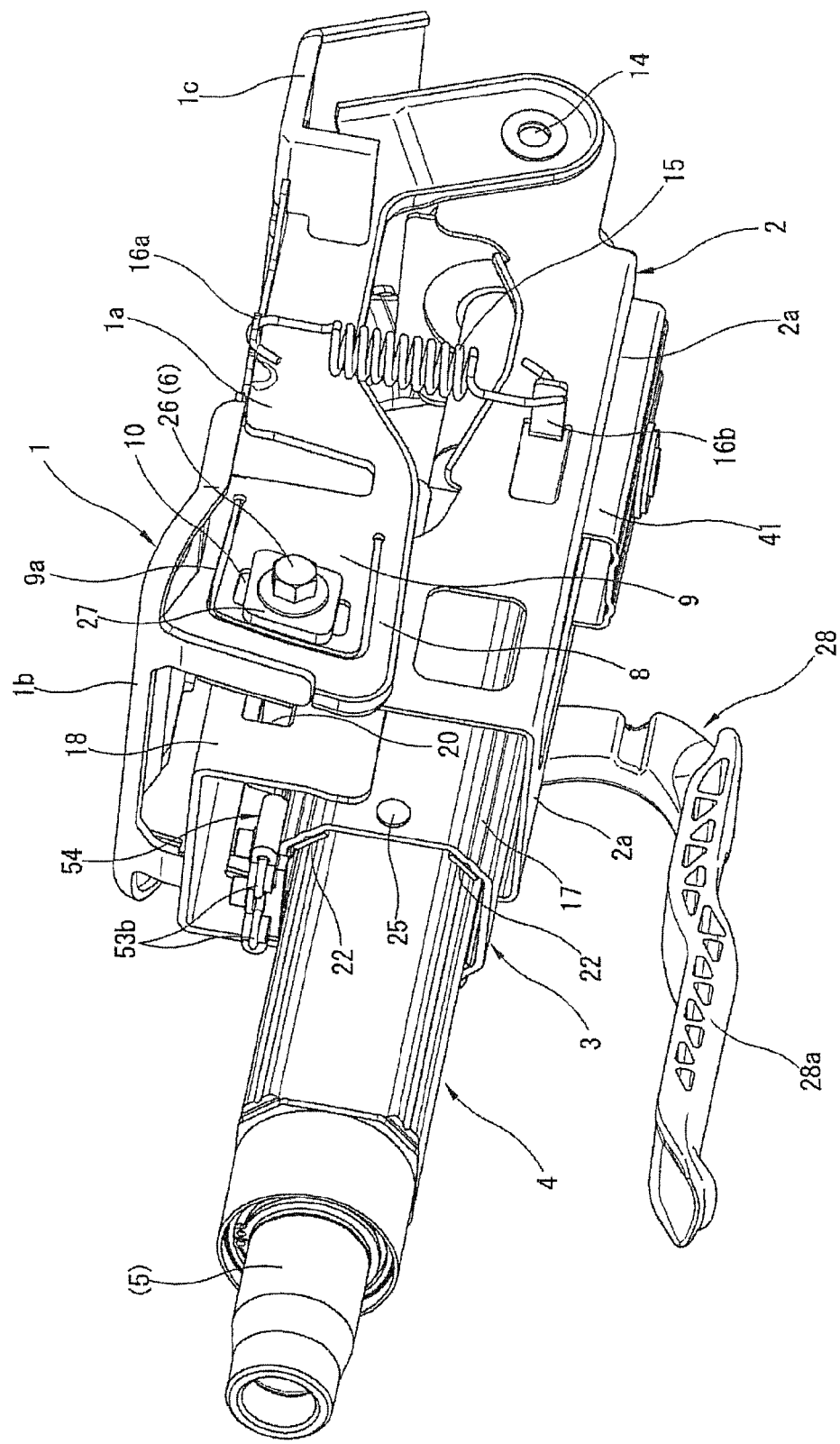
FIG. 1 is a perspective view showing an entire configuration of a steering column device according to a first embodiment of the present invention.
Figure 2:
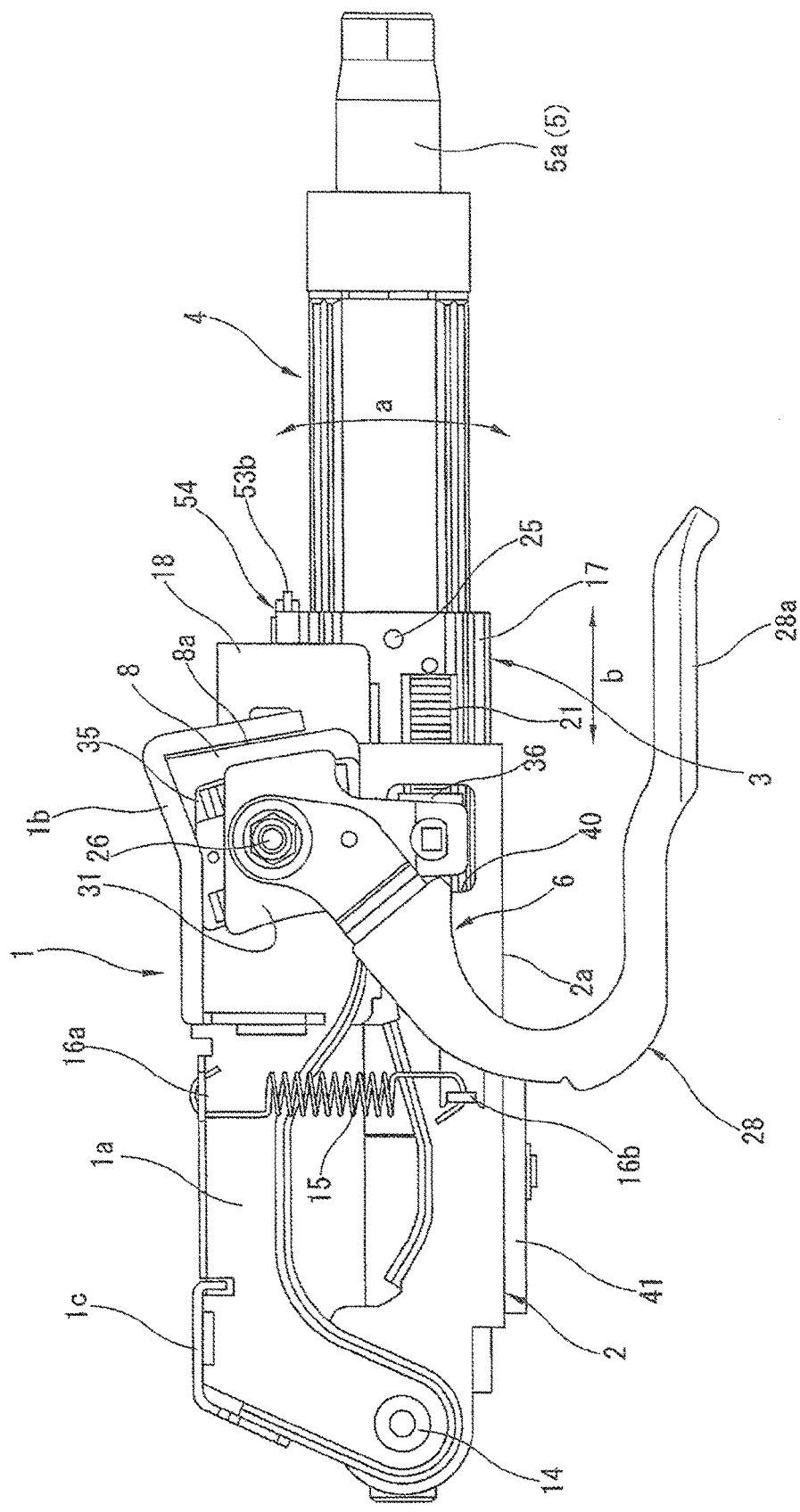
FIG. 2 is a side explanation view showing a left side of the steering column device of FIG. 1.
Figure 3:
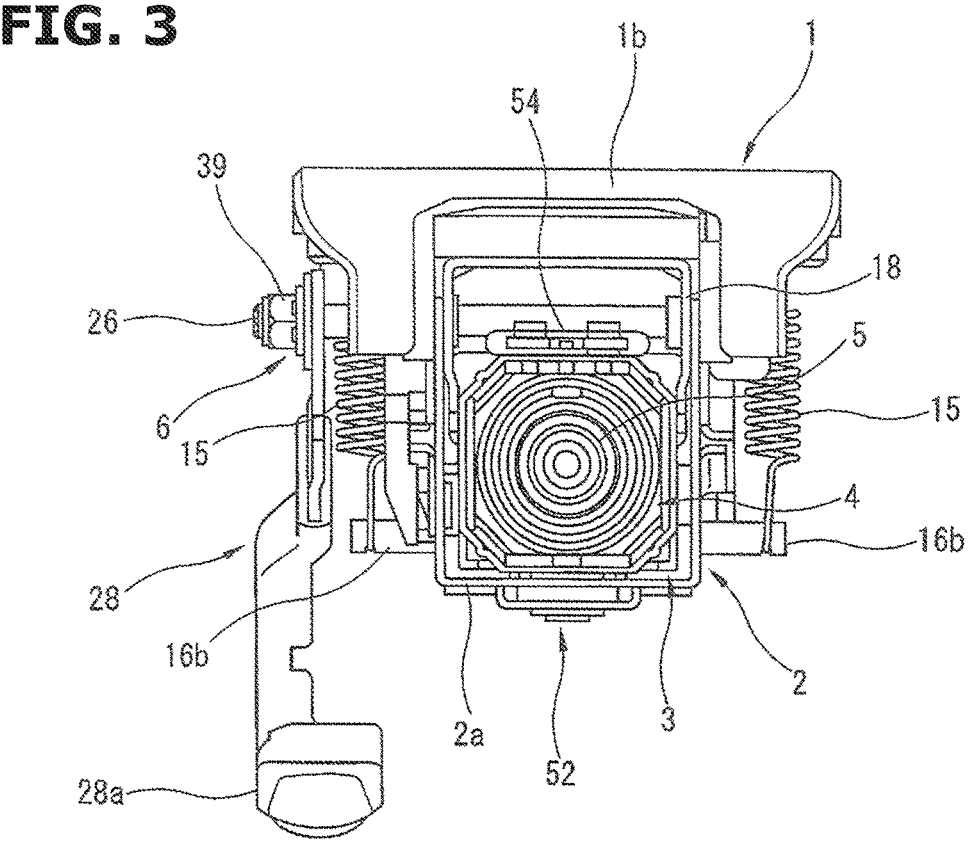
FIG. 3 is a front explanation view showing the steering column device of FIG. 1.
Figure 4:
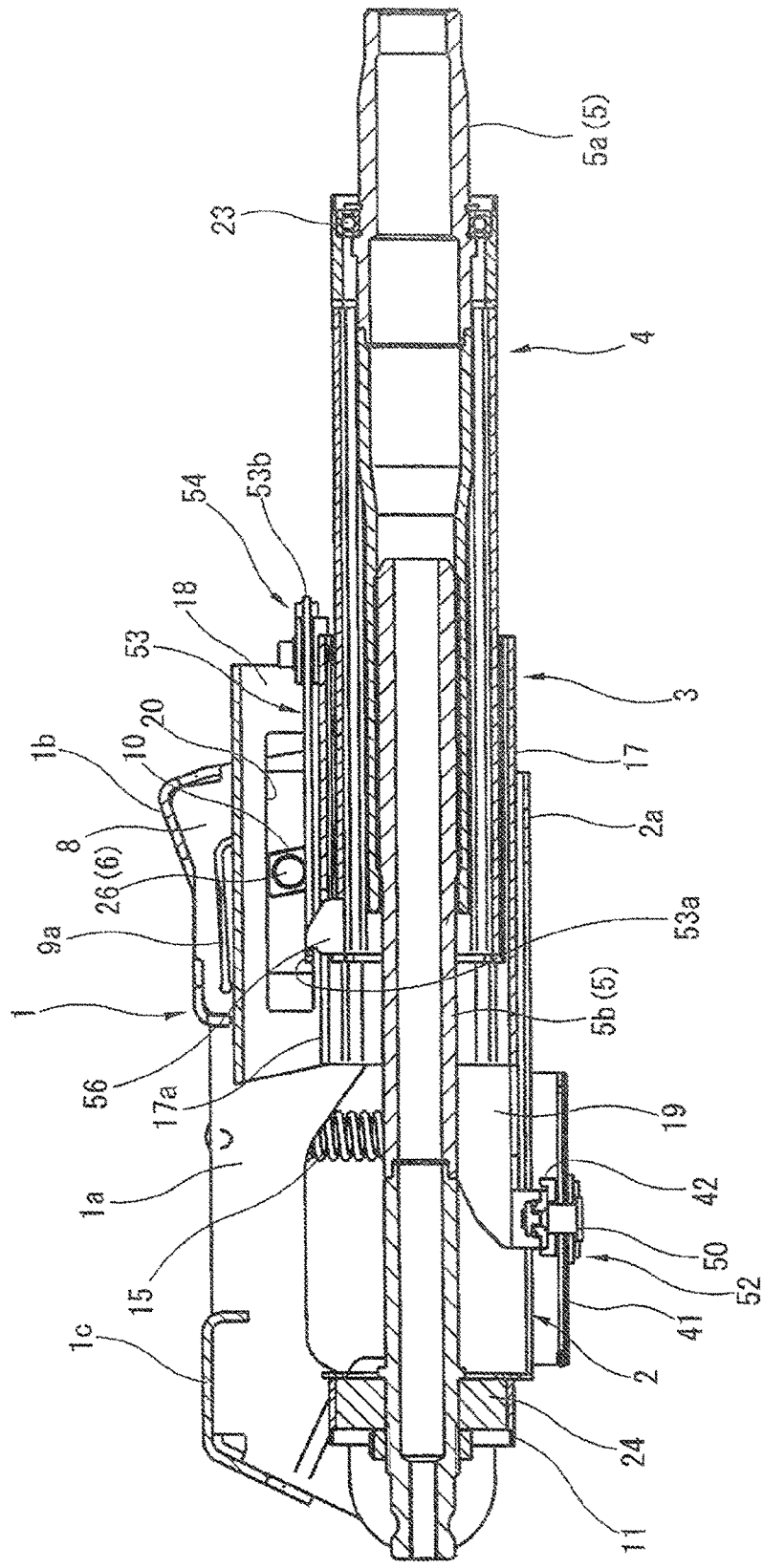
FIG. 4 is a sectional explanation view showing the entire configuration of FIG. 2.
Figure 5:
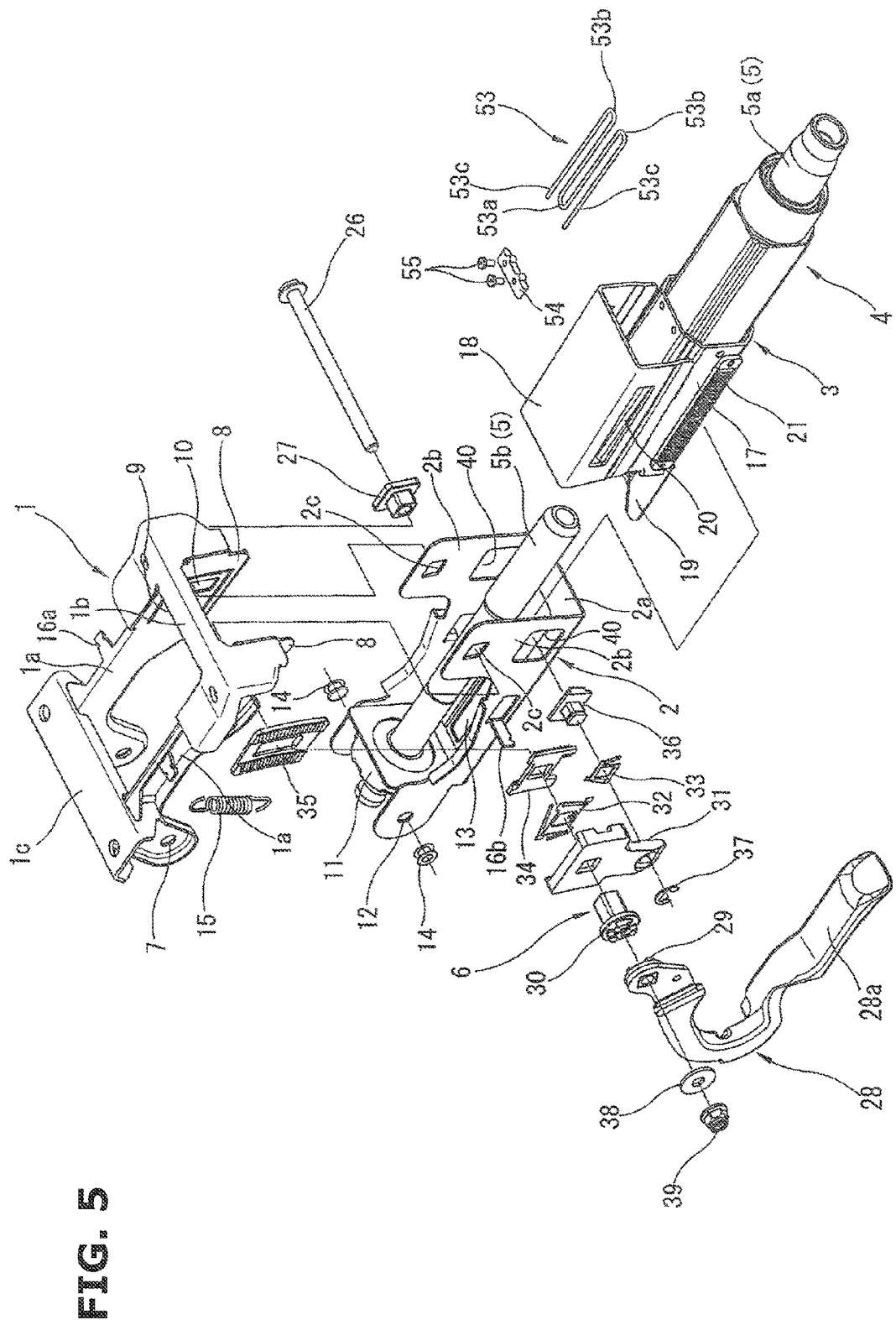
FIG. 5 is an exploded perspective view showing a main part of the steering column device of FIG. 1.

FIG. 1 shows a perspective view showing an overall configuration of the steering column device. FIG. 2 is a side explanation view showing a left side of the steering column device shown in FIG. 1. FIG. 3 is a front explanation view showing the steering column device shown in FIG. 1. FIG. 4 is an overall sectional explanation view showing the steering column device shown in FIG. 2. FIG. 5 is an exploded perspective view showing constituting components of the steering column device shown in FIG. 1. Besides, in below explanations, a "front side", a "rear side", a "front end", a "rear end", "forward and rearward directions", "upward and downward directions", and so on are based on directions in a state where the steering column device is mounted on a vehicle. For example, the "front side" corresponds to a front side of the vehicle.

As shown in FIG. 1 to FIG. 5, the steering column device includes a vehicle body mounting bracket (hereinafter, referred to as "mounting bracket" 1 which serves as a mounting member for mounting the steering column device to the vehicle body; a tilt bracket 2 which is supported on the mounting bracket 1 to be operated to be swung (to adjust the tilt position) in the upward and downward directions (in a direction shown by an arrow a in FIG. 2) with respect to the mounting bracket 1 about a tilt hinge pin 14 (tilt shaft) disposed on the front end portion side of the mounting bracket 1; a middle jacket 3 which is supported on the tilt bracket 2 to be slid (to adjust a telescope position) in the forward and rearward directions (in a direction shown by an arrow b in FIG. 2) with respect to the tilt bracket 2; an upper jacket 4 which is inserted into the middle jacket 3, and which is supported on the middle jacket 3 to be slid in an axial direction relative to the middle jacket 3; a steering shaft 5 which is inserted into the upper jacket 4, and which is arranged to be rotatably supported on the upper jacket 4; and a lock mechanism 6 arranged to engage (lock or clamp) and disengage (unlock or unclamp) the mounting bracket 1, the tilt bracket 2, and the middle jacket 3 for the tilt position adjustment and the telescopic position adjustment. A boss portion of a steering wheel is connected by serration to a rear end portion of the steering shaft 5.

The tilt bracket 2 is mainly operated for the tilt operation with respect to the mounting bracket 1 at the tilt position adjustment. Moreover, the tilt bracket 2 rotatably supports a front end side (portion) of the steering shaft 5. In this embodiment, the tilt bracket 2, the middle jacket 3, and the upper jacket 4 constitute a steering column surrounding the steering shaft 5.

As shown in FIG. 1 and FIG. 5, the mounting bracket 1 includes a pair of left and right side wall portions 1a and 1a; and a pair of front and rear stays 1b and 1c which are disposed to bridge between the side wall portions 1a and 1a (to connect the side wall portions 1a and 1a in a bridge manner). With these, the mounting bracket 1 has a substantially U-shaped shape which is opened in the downward direction when viewed from the front direction. The stays 1b and 1c include, respectively, mounting holes 71. The mounting bracket 1 is fixed to the vehicle body by bolts (not shown) inserted into the mounting holes of the stays 1b and 1c, in an inclination posture in which the mounting bracket 1 is inclined so that a front end portion become lower.

Furthermore, as shown in FIG. 1 and FIG. 5, the mounting bracket 1 includes bearing holes 7 formed at front end portions of the side wall portions 1a. The mounting bracket 1 includes clamping piece portions 8 which are formed at rear end portions of the side wall portions 1a, and which protruding in the downward direction. These clamping piece portions include front end 8a integrally welded to the stay 1b as shown in FIG. 2.

Furthermore, as shown in FIGS. 1, 4, and 5, one of the clamping piece portions 8 includes a tongue piece portion 9 which serves as an easily shape varying portion, and which is surrounded by a slit 9a that has a substantially U-shape directing in the transverse direction. As shown in FIG. 1, this tongue piece portion 9 is cut from the clamping piece portion 8 at the positions of the substantially U-shaped slit 9a to leave the front end portion. With this, the clamping piece portions 8 have the high rigidity. Moreover, it is possible to easily elastically vary the shape of the clamping piece portions 8 in a range of the elastic range of the tongue piece portion 9. Moreover, as shown in FIGS. 1, 4, and 5, each of the clamping piece portions 8 includes a tilt elongated hole 10 which has an arc shape which is formed around the shaft hole 7.

The tilt bracket 2 shown in FIG. 2 includes a pair of left and right side wall portions, and the lower wall portion 2a disposed between the pair of the left and right side wall portions. With this, the tilt bracket 2 has an upwardly opened U-shape which is opened on the upper surface. The tilt bracket 2 includes a bearing holder 11 which is disposed between the pair of the side wall portions at a front end portion of the tilt bracket 2, and which has a cylindrical shape having a flange. The tilt bracket 2 includes shaft holes 12 which are provided at front end portions of the side wall portions of the tilt bracket 2. Moreover, the tilt bracket 2 includes a second telescopic elongated hole 13 which serves for the telescopic position adjustment, which is formed in the lower wall portion 2a, and which extends in the forward and rearward directions. Furthermore, the tilt bracket 2 includes a pair of engagement piece portions 2b which are positioned at rear end portions of the side wall portions, and which extend from the side wall portions in the upward direction. Besides, the second telescopic elongated hole 13 is described later in detail.

As shown in FIG. 1 and FIG. 5, the tilt bracket 2 is assembled to be received within the U-shaped space of the mounting bracket 1. At this time, the shaft holes 12 of the tilt bracket 2 and the shaft holes 7 of the mounting bracket 1 are aligned with each other. In this state, the tilt hinge pin 14 serving as the tilt shaft is inserted into the shaft holes 12 and the shaft holes 7, so that the tilt bracket 2 and the mounting bracket 1 are fixed by the caulking. The tilt bracket 2 is supported on the mounting bracket 1 so as to be pivoted about the tilt hinge pin 14, that is, so as to adjust the tilt position. As described above, the upward opened U-shaped tilt bracket 2 is assembled within the downward opened U-shaped mounting bracket 1. With this, the superimposed portion between the tilt bracket 2 and the mounting bracket 1 has a substantially box shaped section.

Moreover, as shown in FIG. 1 to FIG. 3, assist springs 15 each of which is a helical extension spring are disposed, respectively, on outsides of the side wall portions of the tilt bracket 2. Each of the assist springs 15 includes an upper hook portion which is provided to the upper end portion of the assist spring 15, and which is retained by a retaining portion 16a of the mounting bracket 1; and a lower hook portion which is retained by a retaining portion 16b formed on one of the side wall portions of the tilt bracket 2. With this, the tilt bracket 2 whose the tilt position can be adjusted with respect to the mounting bracket 1 is constantly urged in the upward direction. That is, the tilt bracket 2 is constantly urged about the tilt hinge pin 14 in the counterclockwise direction of FIG. 2. With this, the dropping (detachment) of the steering column is prevented at the release of the engagement. Moreover, the operation force in the upper direction of the tilt is decreased.

The engagement piece portions 2b formed at the rear end portions of the both side wall portions of the tilt bracket 2 shown in FIG. 5 can elastically vary its shapes in the directions in which the engagement piece portions 2b are moved to be near each other, and to be apart from each other. Each of the engagement piece portions 2b includes an shaft hole 2c having a substantially parallelogram shape.

The middle jacket 3 shown in FIGS. 1, 2, 4, and 5 includes a jacket main body 17 which has a rectangular cylindrical shape or a transformational octagonal cylindrical shape as described below; and a distance bracket 18 which serves as a distance section, and which is fixed on the upper surface of the jacket main body 17; and a front bracket 19 which has an upwardly opened U-shape, and which extends from the front end of the jacket main body 17.

The distance bracket 18 has the downwardly opened U-shaped shape which is opened on the lower surface the distance bracket 18. The distance bracket 18 is disposed to bridge the jacket main body 17. Lower end portions of the distance bracket 18 is fixed to the jacket main body 17 by welding and so on. In the middle jacket 3, the jacket main body 17 has the rectangular cylindrical shape or the transformational octagonal cylindrical shape. Moreover, the distance bracket 18 is fixed by the welding on the upper end surface side of the middle jacket 3, so that a portion between the middle jacket 3 and the jacket main body 17 has a box-shaped section. The both side wall portions of the distance bracket 18 are abutted and slid on the inner side surfaces of the tilt bracket 2. Each of the side wall portions of the distance bracket 18 includes a first telescopic elongated hole 20 which extends in the forward and rearward directions, and which serves as a guide at the telescopic position adjustment in the forward and rearward directions.

Moreover, as shown in FIG. 2 and FIG. 5, a column side telescopic lock teeth plate 21 is fixed on one of the side wall portions of the rectangular or the transformational octagonal shape jacket main body 17 of the middle jacket 3. The column side telescopic lock teeth plate 21 has lock teeth which has a shape like racks extending along in the forward and rearward directions. Furthermore, the middle jacket 3 is slidably disposed within an inside space between the mounting bracket 1 and the tilt bracket 2 which have the U-shapes, as described later. With this, it is possible to engage and hold the distance bracket 18 of the middle jacket 3 from the both sides by the clamping piece portions 8 of the mounting bracket 1 and the engagement piece portions 2b of the tilt bracket 2.

The upper jacket 4 shown in FIGS. 1, 2, 4, and 5 has a rectangular cylindrical shape or a transformational octagonal cylindrical shape which is similar to (analogous to) the jacket main body 17. The upper jacket 4 is slidably inserted through a linear bearing or a linear guide (cf. FIG. 1) into the jacket main body 17. Moreover, the upper shaft 5a of the steering shaft 5 is rotatably supported through the upper bearing 23 (cf. FIG. 4) on the upper jacket 4. The lower shaft 5b of the steering shaft 5 is connected to the upper shaft 5a by the serration mounting so as be moved with respect to the upper shaft 5 in the axial direction, and so as to rotate as a unit with the upper shaft 5a. Besides, the front end portion of the lower shaft 5b is rotatably supported through the lower bearing 24 (cf. FIG. 4) supported by the bearing holder 11 of the tilt bracket 2 of FIG. 5. For example, the front end portion of the lower shaft 5b is connected through a universal joint (coupling) or an intermediate shaft, to an input portion of the steering gear device (not shown).

As shown in FIGS. 1 and 2, the jacket main body 17 of the middle jacket 3 and the upper jacket 4 are relatively positioned in the axial direction. A shear pin (shearing pin) 25 made from a resin and so on is press-fitted in the pin holes formed in the side wall portions of the jacket main body 17 and the upper jacket 4 so as to bridge the both side wall portions. With this, the jacket main body 17 of the middle jacket 3 and the upper jacket 4 are fixed to each other. Besides, the shear pin 25 is arranged to connect the jacket main body 17 of the middle jacket 3 and the upper jacket 4 in the normal state so as to prevent the relative movement of the jacket main body 17 and the upper jacket 4. The shear pin 25 is arranged to be sheared when a load that is equal to or greater than a predetermined load is acted to the upper jacket 4 at the collision of the vehicle, so as to allow the relative movement of the jacket main body 17 and the upper jacket 4.

As described above, the steering column constituted by the tilt bracket 2, the middle jacket 3, the upper jacket 4, and the steering shaft 5 is swung about the tilt hinge pin 14 so as to adjust the tilt position. On the other hand, the middle jacket 3 and the tilt bracket 2 are relatively moved to each other so as to adjust the telescopic position.

The lock mechanism 6 shown in FIG. 5 includes a lock bolt 26 which is a clamp shaft, a stroke guide 27, an operation lever 28 including a handle (handgrip) portion 28 extending in the rearward direction, a ride-on cam member 29 and a profile cam member 30, a teeth connection plate 31, spring members 32 and 33 which are plate springs for the tilt lock and the telescopic lock, a lever side tilt lock teeth plate 34, a fixed side tilt lock teeth plate 35 confronting the lever side tilt lock teeth plate 34, the lever side telescopic lock teeth plate 36, and so on. The fixed side tilt lock teeth plate 35 is fixed to one of the clamping piece portions 8. The fixed side tilt lock teeth plate 35 includes a tilt elongated hole.

The stroke guide 27 shown in FIG. 5 penetrates through the tilt elongated hole 10 of the one of the clamping piece portions 8, and the rectangular hole 2c formed in one of the engagement piece portions 2b of the tilt bracket 2. The stroke guide 27 is mounted within the first telescopic elongated hole 20 formed in the distance bracket 18 of the middle jacket 3 so as to be slid within the first telescopic elongated hole 20 in the forward and rearward directions, and so as to restrict the rotation of the stroke guide 27. The ride-on cam member 29 is mounted and held in the rectangular hole of the operation lever 28 which has a substantially parallelogram shape so as not to be rotated. The teeth connection plate 31, the spring member 32, and the lever side tilt lock teeth plate 34 are mounted and supported on the angular column portion of the profile cam member 30 so as not to be rotated. That angular column portion of the profile cam member 30 penetrates through the angular hole 2c formed in the other of the engagement piece portions 2b of the tilt bracket 2. The angular column portion of the profile corn member 30 is mounted and held in the first telescopic elongated hole 20 formed in the distance bracket 18 of the middle jacket 3 so as to be moved in the forward and rearward directions, and so as not to be rotated. The lever side telescopic lock teeth plate 36 includes a rectangular column portion. The spring member 33 for the telescopic movement is mounted on this rectangular column portion of the lever side telescopic lock teeth plate 36 so as to restrict the rotation of the spring member 33. The spring member 33 is held in the lower rectangular hole of the teeth connection plate 31 to be slid in the axial direction of the rectangular hole in a state where the rotation of the spring member 33 is restricted. A snap ring 37 prevents the spring member 33 from dropping off.

In a state where the middle jacket 3 and the tilt bracket 2 are received and assembled within the U-shaped space of the downwardly opened U-shaped bracket 1, the lock bolt 26 is inserted into the stroke guide 27 mounted and held in the rectangular hole 2c of the tilt bracket 2, the first telescopic elongated hole 20 formed in the distance bracket 18, the fixed side tilt lock teeth plate 35, the lever side tilt lock teeth plate 34, the spring member 32 for the tilt lock, the teeth connection plate 31, the profile cam member 30 mounted and held in the rectangular hole 2c of the tilt bracket 2, and the ride-on cam member 29 mounted and held in the rectangular hole of the operation lever 28. A nut 39 is tightened through a bearing (thrust needle bearing) 38 from the operation lever 28's side, so as to prevent the detachment.

With this, as described above, the stroke guide 27 is slidably mounted and held in the first telescopic elongated hole 20 formed in the one of the side wall portions of the distance bracket 18 of the middle jacket 3. The rectangular column portion of the profile cam member 30 is slidably mounted and held in the first telescopic elongated hole 20 formed in the other of the side wall portions of the distance bracket 18 of the middle jacket 3.

Each of the fixed side tilt lock teeth plate 35 and the lever side lock teeth plate 34 includes saw-like lock teeth which are formed on a confronting surface of the each of the fixed side tilt lock teeth plate 35 and the lever side lock teeth plate 34 on which the fixed side tilt lock teeth plate 35 and the lever side lock teeth plate 34 confront each other. The lever side tilt lock teeth plate 34 is arranged to be moved toward or apart from the fixed side tilt lock teeth plate 35 in accordance with the rotation operation of the operation lever 28, and thereby to be engaged with and disengaged (released) from the fixed side tilt lock teeth plate 35. The lever side tilt lock teeth plate 34 and the fixed side tilt lock teeth plate 35 are arranged to lock and unlock the tilt position adjustment. Moreover, as shown in FIG. 2, the lever side telescopic teeth plate 36 confronts the fixed side telescopic lock teeth plate 21 of the middle jacket 3 from the opening window portion 40 of the tilt bracket 2. These fixed side telescopic lock teeth plate 21 and the lever side telescopic lock teeth plate 36 have a function to lock and unlock the telescopic position adjustment, like the relationship between the fixed side tilt lock teeth plate 35 and the lever side tilt lock teeth plate 34.

In this case, the telescopic position adjustment is performed in a range of the first telescopic elongated holes 20 formed in the distance bracket 18 of the middle jacket 3. Moreover, the lower wall portion 2a of the tilt bracket 2 includes a second telescopic elongated hole 13 for the telescopic position adjustment, as shown in FIG. 5.

Figure 6:
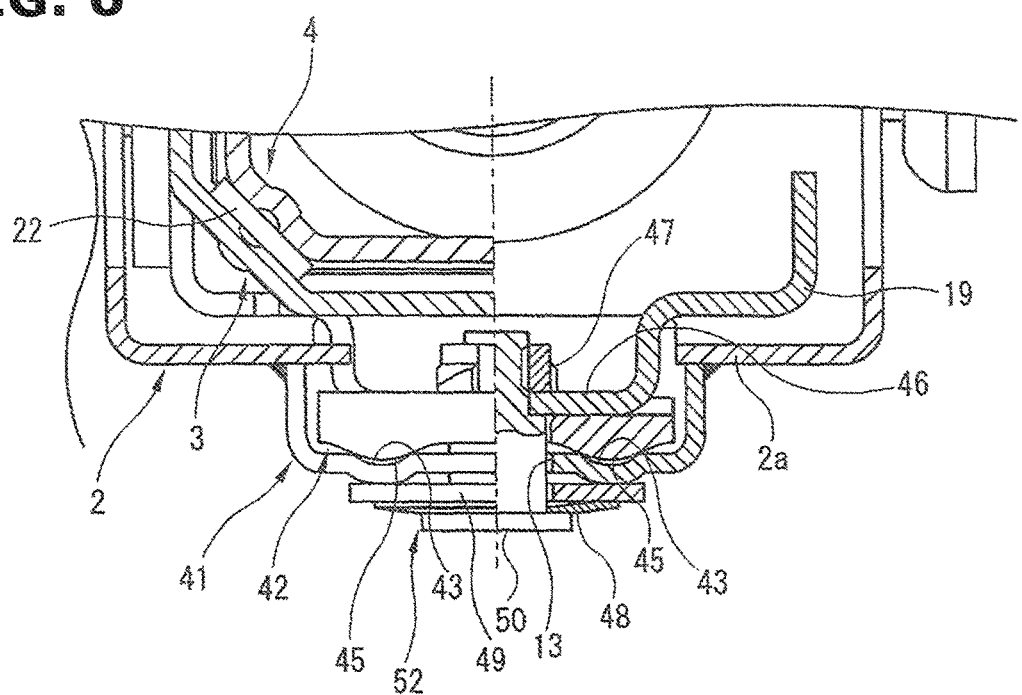
FIG. 6 is a sectional explanation view showing an enlarged main part of FIG. 3.
Figure 7A:
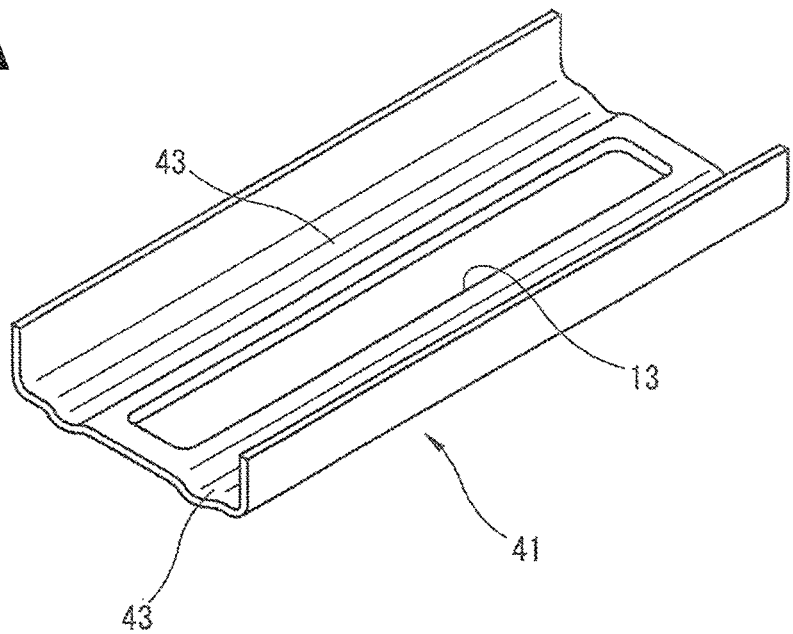
FIG. 7A is a perspective view showing a bottom bracket shown in FIG. 6.
Figure 7B:
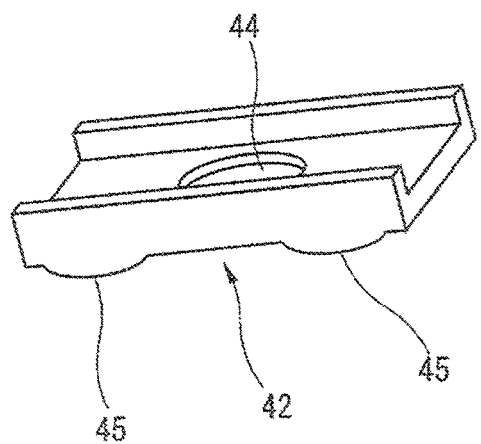
FIG. 7B is a perspective view showing a slider shown in FIG. 6.

FIG. 6 shows a sectional view in which the main portion of FIG. 3 is enlarged. As shown in FIGS. 1, 2, 4, and 6, the bottom bracket 41 is fixed on the lower wall portion 2a of the tilt bracket 2 by the welding so as to protrude in the downward direction. As shown in FIG. 7A, this bottom bracket 41 has a flat shape and an upwardly opened U-shaped section. A slider 42 shown in FIG. 7B is disposed on the bracket 41 to be superposed on the bracket 41. The slider 42 is a slider member made from a resin. Besides, in FIG. 6, different cross sections are combined to form FIG. 6 for easing the understanding at these portions.

Moreover, as shown in FIG. 4, the front end portion of the front bracket 19 of the middle jacket 3 is disposed on the slider 42 to be superimposed on the slider 42, as described later. Furthermore, the bottom bracket 41 shown in FIG. 7A includes a second telescopic elongated hole 13. Moreover, the bottom bracket 41 includes guide grooves 43 each of which has an arc section, which are formed on both sides of the second telescopic elongated hole 13 to sandwich the second telescopic elongated hole 13, which extend in parallel with each other near the second telescopic elongated hole 13, and each of which includes an upper surface that is recessed in the downward direction. This second telescopic elongated hole 13 is positioned on the front side of the first telescopic elongated holes 20 formed in the distance bracket 18 of the middle jacket 3 shown in FIG. 5.

On the other hand, the slider 42 shown in FIG. 7B includes a mounting hole 44 penetrating through the slider 42. The slider 42 includes protruding portions 45 each of which has an arc section, each of which has a downwardly raised shape, which are formed on the both sides of the mounting hole 44 at positions corresponding to the guide grooves 43 of the bottom bracket 41 shown in FIG. 8A.

Moreover, as shown in FIGS. 6 and 7, when the bottom bracket 41 and the slider 42 are superimposed on each other, the mounting hole 44 of the slider 42 is aligned with the second telescopic elongated hole 13 of the bottom bracket 41. Furthermore, the protruding portions of the slider 42 are aligned with the guide grooves 43 of the bottom bracket 41. In this case, the surface of each of the guide grooves 43 on which one of the protruding portions 45 of the slider 42 is contacted has a radius of curvature smaller than a radius of curvature of the one of the protruding portions 45, so that each of the protruding portions 45 of the slider 42 is contacted on one of the guide grooves 43 of the bottom bracket 41 by the line contact in the longitudinal direction.

Figure 8A:
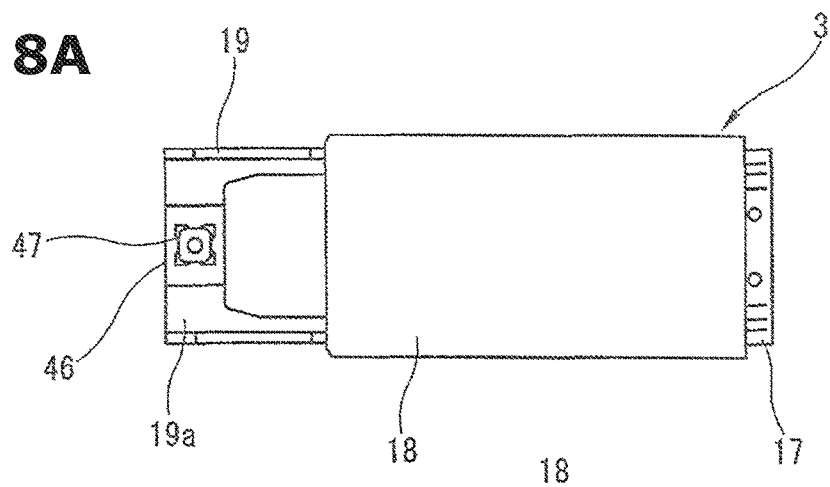
FIGS. 8A to 8C are views showing a distance bracket shown in FIG. 5.
Figure 8B:
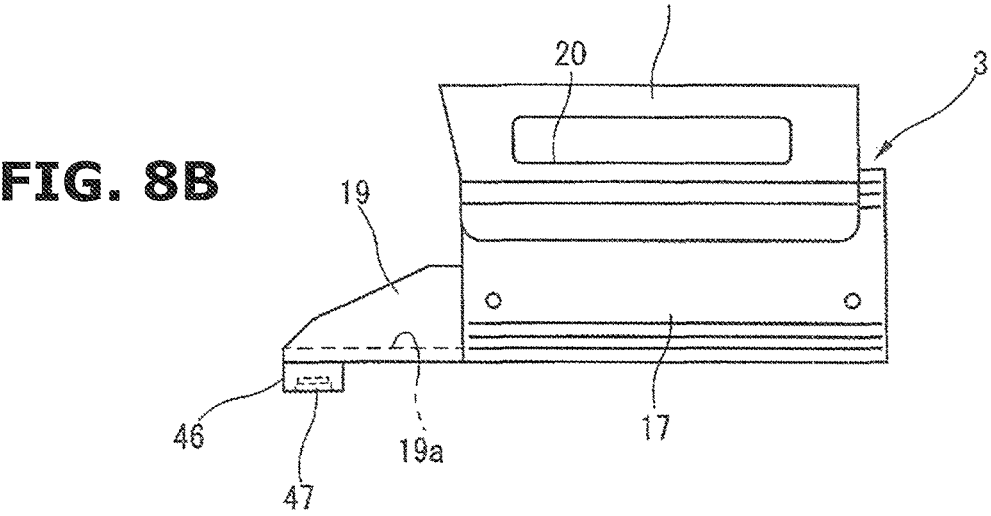
Figure 8C:
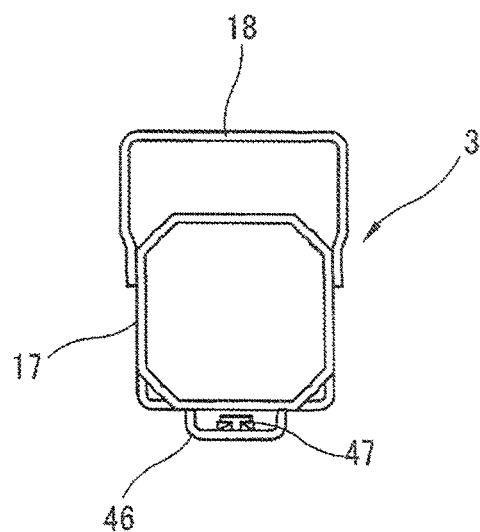

FIGS. 8A, 8B, and 8C show the only middle jacket 3 described above. FIG. 8A is a plan view. FIG. 8B is a front view of FIG. 8A. FIG. 8C is a left side view of FIG. 8B. The substantially upwardly opened U-shaped front bracket 19 is welded and fixed on the front end of the jacket main body 17 so as to elongate this front end of the jacket main body 17. This bottom wall portion 19a of this front bracket 19 includes a seat flange portion 46 which has a substantially upwardly opened U-shape, which protrudes toward the tilt bracket 2, which confront the bottom bracket 41, and which is a seat portion of the slider 42. A nut (projection nut) 47 is welded and fixed on this seat flange portion 46. Besides, the bottom wall portion 19a of the front bracket 19 is integrated with the bottom wall portion of the jacket main body 17 of the middle jacket 3 as a part of the bottom wall of the jacket main body 17.

Figure 9:
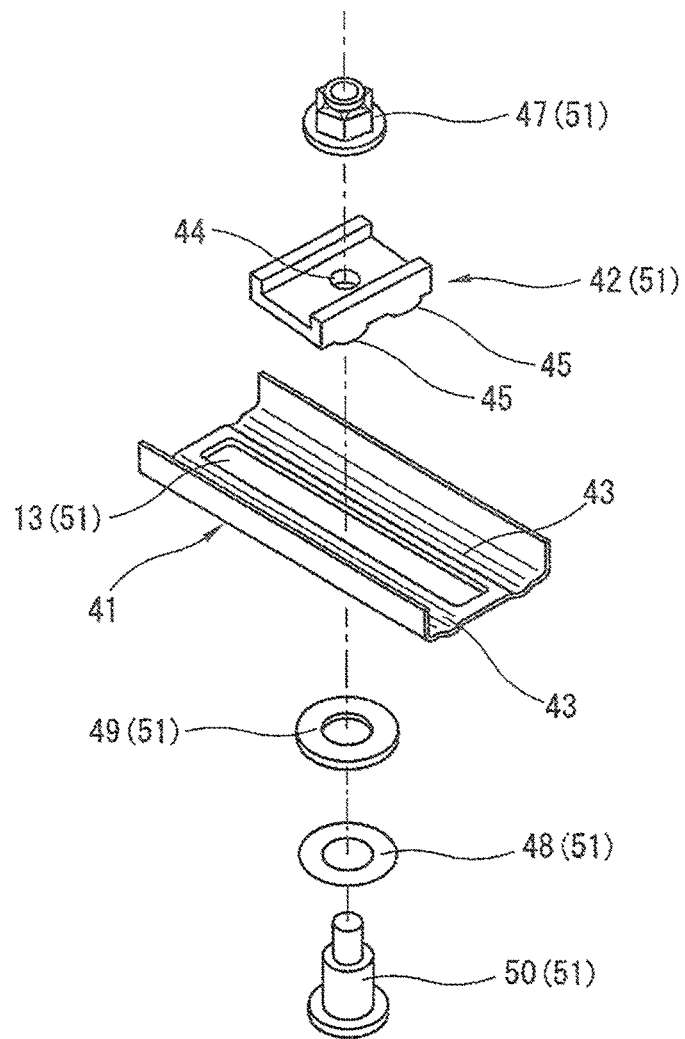
FIG. 9 is an enlarged perspective view showing main parts of FIG. 6.
Figure 10:
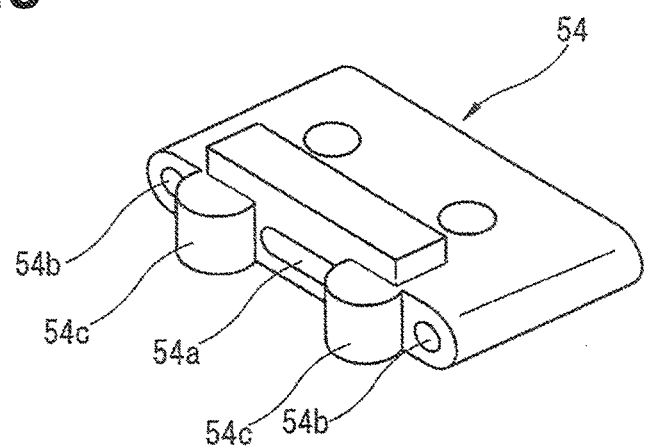
FIG. 10 is a perspective view showing a wire holder shown in FIG. 5.

FIG. 9 is an exploded view showing a relationship between the bottom bracket 41, the slider 42, and the nut 47 of the front bracket 19. In FIG. 10, the front bracket 19 is omitted.

As shown in FIG. 6 and FIG. 9, the bolt 50 which is a tightening member having a stepped shape is inserted from the lower side of the bottom bracket 41 through a disk spring 48 that is an elastic member, and a washer 49, into the second telescopic elongated hole 13 and the mounting hole 44 of the slider 42. This bolt 50 is tightened into the nut 47 which is the tightening member, and which is fixed and welded on the seat flange portion 46 of the front bracket 19. With this, the bottom bracket 41 including the second telescopic elongated hole 13, the slider 42, and the seat flange portion 46 of the front bracket 19 are elastically tightened together. With this, as shown in FIG. 6, the bottom bracket 41 and the washer 49 are contacted on two portions on the back surface side of the guide grooves 43 by the line contacts. Moreover, the guide grooves 43 of the bottom bracket 41 and the protruding portions 45 of the slider 42 are pressed and contacted on each other. Accordingly, each of the protruding portions 45 is contacted at the two portions of one of the guide grooves 43 by the line contacts.

With these structure, for the telescopic position adjustment, the middle jacket 3 and the slider 42 are supported on the bottom bracket 41 of the tilt bracket 2 to be slid with respect to the bottom bracket 41 of the tilt bracket 2. The bottom bracket 41, the slider 42, and the seat flange portion 46 of the front bracket 19 are elastically tightened together. With this, the backlash in the upward and downward directions and in the leftward and rightward directions of FIG. 6 is not generated. Moreover, the bottom bracket 41 and the washers 49 are contacted by the line contacts. Furthermore, the guide grooves of the bottom bracket 41 and the protruding portions 45 of the slider 42 are contacted by the line contacts. Accordingly, it is possible to decrease the frictional resistance, and to smoothly operate the telescopic position adjustment by the small operational force.

That is, as shown in FIG. 6, the bolt 50 has a stepped shape between the shaft portion and the screw portion on which the nut 47 is jointed. This stepped portion of the bolt 50 is abutted and fixed on the lower surface of the front bracket 19. With this, the front bracket 19, the slider 42, and the bottom bracket 41 are tightened by the elastic force of the disc spring 48 which is the elastic member disposed between the head portion of the bolt 50 and the washer 49. Accordingly, the large pressing load is not generated. It is possible to decrease and stabilize the sliding frictional resistance. Moreover, the guide grooves 43 of the bottom bracket 41 and the protruding portions 45 of the slider 43 are contacted by the line contacts. Accordingly, self-centering effect is attained. It is possible to smoothly relatively position the bottom bracket 41 and the slider 42.

As explained above, the sliding guide member 51 provided to the middle jacket 3 for the telescopic position adjustment is constituted by the slider 42 which is the sliding member sandwiched between the bottom bracket 41 of the tilt bracket 2 and the front bracket 19 of the middle jacket 3, the disc spring 48, the washer 42, the bolt 50, and the nut 47 which elastically tighten that slider 42 between the bottom bracket 41 and the front bracket 19. Moreover, the telescopic guide mechanism 52 is constituted by this sliding guide member 51, and the second telescopic elongated hole 13 of the bottom bracket 41.

As shown in FIGS. 4 and 5, an energy absorption wire (hereinafter, referred to as wire) 53 is disposed on an upper surface of the jacket main body 17 of the middle jacket 3. The wire 53 is arranged to absorb the energy at the collision. This wire 53 is bent into a flat W-shape or a flat M-shape. The wire 53 includes a front bending base portion 53a positioned on the front end side, and free end portions 53c positioned on the both sides of the front bending base portion 53a, and rear bending base portions 53b positioned on the rear end side. The front bending base portion 53a and the free end portions 53c are inserted, respectively, into wire insertion holes 54a and 54b of the wire guide 54 which is a guide member shown in FIG. 10. Then, this wire 53 and the wire guide 54 are fixed on the upper surface of the jacket main body 17 by two screws 55. Then, the front bending base portion 53a of the wire 53 is retained on a retaining portion 56 formed on the upper surface of the front end of the upper jacket 4 to protrude from the upper surface of the front end of the upper jacket 4, as shown in FIG. 4. On the other hand, the pair of the rear bending base portions 53b of the wire 53 are wound, respectively, around guide surfaces of semicircular cylindrical guide protruding portions 54c of the wire guide 54 shown in FIG. 10.

In the above-described structure, when the load is acted to the steering column through the steering wheel and the steering shaft 5 to compress the steering column at the secondary collision due to the collision of the vehicle, the shear pin 25 shown in FIGS. 1 and 2 is sheared. Then, the upper jacket 4 is compressed (constricted) through the linear guide member 22 with respect to the jacket main body 17 of the middle jacket 3. At this time, the wire 53 retained on the retaining portion 56 of the upper jacket 4 shown in FIG. 4 is pulled out. That wire 53 is continuously deformed along the guiding surfaces of the guide protruding portions 54c, so as to absorb the collision energy. Besides, the retaining portion 56 is inserted into the slit 17a of the jacket main body 17 shown in FIG. 4. Accordingly, the retaining portion 56 does not interfere with the assembly operation of the upper jacket 4 and the jacket main body 17.

Hereinafter, in the thus-constructed steering column device, the tilt position adjustment operation and the telescopic position adjustment operation are explained.

As shown in FIGS. 1 and 2, in the lock state, the hand grip portion 28a of the operation lever 28 extends substantially parallel to the steering column. In this lock state, cam ridges of the ride-on cam member 29 rides on cam ridges of the profile cam member 30. The tilt position adjustment function and the telescopic position adjustment function of the steering column are in the lock state.

That is, the cam ridges of the ride-on cam member 29 and the profile cam member 30 rides on each other. Accordingly, the lock bolt 26 is pulled on the operation lever 28's side in the axial direction of the lock bolt 26, so that the distance between the stroke guide 27, the teeth connection plate 31, and the profile cam member 30 is decreased. With this, the pair of the clamping piece portions 8 of the mounting bracket 1 which are positioned on the outermost positions, the pair of the engagement piece portions 2b of the tilt bracket 2 and the distance bracket 18 of the middle jacket 3 which are positioned inside the clamping piece portions 8 are compressed and engaged in the axial direction of the clamp bolt 26. At the same time, the lock teeth of the lever side tilt lock teeth plate 34 shown in FIG. 5 is engaged with the lock teeth of the fixed side tilt lock teeth plate 35 of one of the clamping piece portions 8 of the mounting bracket 1. Furthermore, the lock teeth of the lever side telescopic lock teeth plate 36 is pressed by the teeth connection plate 31 through the spring 33. With this, the lock teeth of the lever side telescopic lock teeth plate 36 is engaged with the lock teeth of the column side telescopic lock teeth plate 21 which are provided on the side surface of the middle jacket 3.

Besides, even in a case where the lock teeth of the lock teeth plates 34 and 36 which are the lever side, and the lock teeth of the lock teeth plates 35 and 21 which are the fixed side or the column side are in the teeth tip lock state where these are connected with each other at the teeth tips, the spring members 32 and 33 which urge the lock teeth plates 34 and 36 that are the lever side are elastically deformed, so that the clamping piece portion 8 and the teeth connection plate 31 are pressed and contacted on each other. Accordingly, it is possible to lock the steering column device, irrespective of the shaft force generated in the lock bolt 26.

With this, the tilt bracket 2 is locked so as to unable the tilt position adjustment with respect to the mounting bracket 1. Moreover, the middle jacket 3 is locked so as to unable the telescopic position adjustment with respect to the mounting bracket 1.

On the other hand, the hand grip portion 28a of the operation lever 28 shown in FIGS. 1 and 2 is operated to be pivoted a predetermined amount in the downward direction at the tilt position adjustment (the position adjustment in the upward and downward directions of the vehicle) or the telescopic position adjustment (the position adjustment in the forward and rearward directions of the vehicle). By this pivot operation of the operation lever 28 in the downward direction, the cam ridge of the ride-on cam member 29 shown in FIG. 5 falls in the groove portion between the cam ridges of the profile cam member 30 which is the counterpart side. The shaft force of the lock bolt 26 is decreased so as to release the compressing clamping force which is (has been) acted to the clamping piece portion 8 of the mounting bracket 1 and so. With this, the steering column is brought to the unlock state.

In this case, the spring member 32 is arranged to urge the tilt lock teeth plate 35 which is the column side, in the lock direction, and to release the tilt lock teeth plate 35 in the unlock direction. In the unlock state, the tilt lock teeth plate 34 which is the lever side is maintained by the spring member 32 in a state where the tilt lock teeth plate 34 is released from the fixed side tilt lock teeth plate 35 which is the counterpart. Moreover, at this time, the teeth connection plate 31 is simultaneously moved in the unlock direction. The lever side telescopic lock teeth plate 36 is maintained in a state where the lever side telescopic lock teeth plate 36 is released from the column side telescopic lock teeth plate 21 which is the counterpart side.

In this unlock state, the tilt bracket 2 is operated to be pivoted about the tilt hinge pin 14 in the upward and downward directions of the vehicle (in a direction shown by an arrow in FIG. 2). With this, it is possible to adjust the position of the steering column so as to operate the tilt bracket 2, the middle jacket 3, and the upper jacket 4 as a unit with one another. With this, it is possible to perform the tilt position adjustment (the position adjustment in the upward and downward directions of the vehicle) within a range of the tilt elongated holes 10 formed in the pair of the clamping piece portions 8 of the mounting bracket 1 and the tilt elongated hole of the fixed side tilt lock teeth plate 35.

Moreover, in the unlock state, the upper jacket 4 and the middle jacket 3 is moved in the forward and rearward directions of the vehicle (in a direction shown by b in FIG. 2). With this, it is possible to perform the telescopic position adjustment (the position adjustment in the forward and rearward directions of the vehicle) within a range of the first telescopic elongated holes 20 formed in the distance bracket 18 of the middle jacket 3, and the second telescopic elongated hole 13 formed in the bottom bracket 41 of the tilt bracket 2, as shown in FIG. 5. In this case, the lock bolt 26 is inserted into the first telescopic elongated holes 20. Accordingly, the lock bolt 26 is not interfered with the telescopic position adjustment.

By operating the operation lever 28 to be pivoted again in the upward direction to the position of FIGS. 1 and 2 after the tilt position adjustment and the telescopic position adjustment, the steering column device is returned to the prior lock state.

In the thus-constructed steering column device in which the tilt position adjustment function and the telescopic position adjustment function are attained, the slide guide function at the telescopic position adjustment is attained by the first telescopic elongated hole 20 formed in the distance bracket 18 of the middle jacket 3, and the second telescopic elongated hole 13 formed in the bottom bracket 41 of the tilt bracket 2 on the front side (of the vehicle) of the first telescopic elongated hole 20. Accordingly, it is possible to stably perform the telescopic position adjustment.

Moreover, in the bottom bracket 41 of the tilt bracket 2 which includes the second telescopic elongated hole 13, the slider 42 which serves as a part of the sliding guide member is sandwiched and elastically tightened together between the bottom bracket 41 and the front bracket 19 of the middle jacket 3, as shown in FIGS. 6 and 9. Accordingly, a gap in the telescopic guide mechanism 51 in the upward and downward directions is eliminated. Consequently, the steering column device can strengthen the input in the upward and downward directions to the steering column. Therefore, it is possible to improve the rigidity for the support (the support rigidity), and to strengthen the vibration. The wobble and the vibration are not generated in the vehicle mounting state.

Furthermore, at the contact portion between the slider 42 and the bottom bracket 41 including the second telescopic guide hole 13, in a relationship between the two guide grooves 43 which are formed in the bottom bracket 41, and which have the arc cross sections, and the protruding portions 45 which are pressed and abutted (contacted) on the guide grooves 43, and which have the arc cross sections like the two guide grooves 43, the protruding portions 45 of the slider 42 have the radius of curvature which is greater than the radius of the curvature of the guide grooves 43. The guide grooves 43 and the protruding portions 45 are contacted by line contacts on each other at two portions of the arc surfaces thereof. Accordingly, the frictional resistance between the guide grooves 43 and the protruding portions 45 are small. Consequently, it is possible to smoothly and stably perform the sliding movement at the telescopic position adjustment. The backlash or the wobble in the leftward and rightward directions of the steering column are not generated, in addition to the upward and downward directions. With these, it is possible to further improve the support rigidity.

Figure 11:
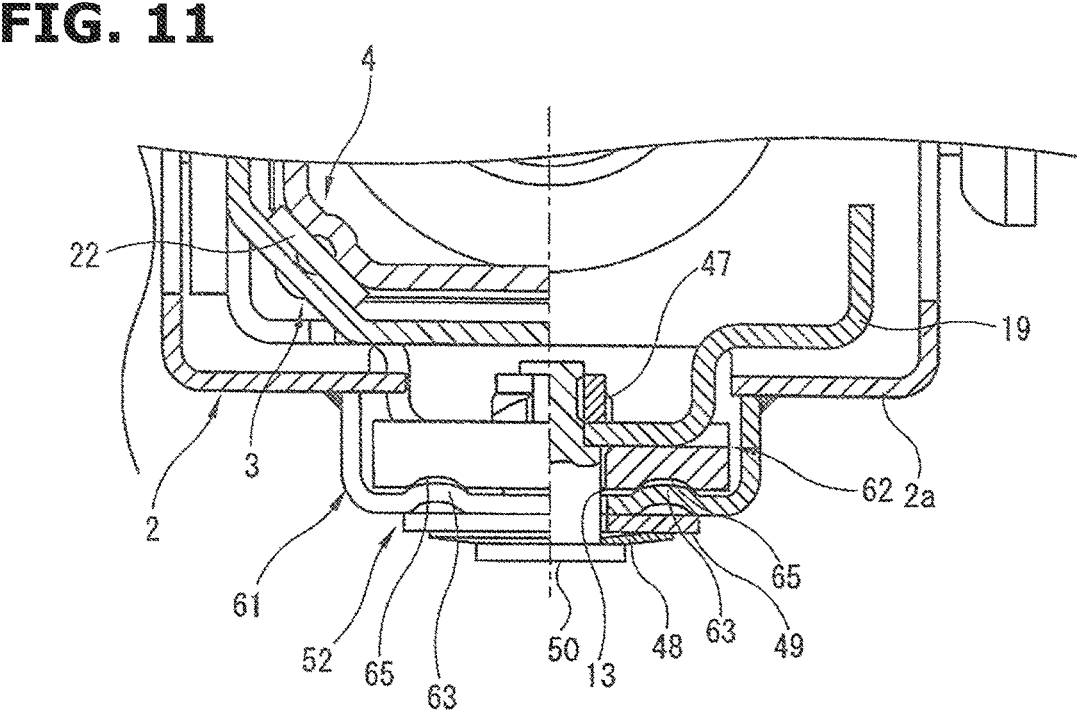
FIG. 11 is a view showing a steering column device according to a second embodiment of the present invention, and which shows a variation identical to the portion shown in FIG. 6.

FIG. 11 shows a steering column device according to a second embodiment of the present invention. FIG. 11 shows a variation of the telescopic guide mechanism 52 shown in FIG. 6. In the telescopic guide mechanism 52, the relationship between the recessed portion and the raised portion of the bottom bracket 61 and the slider 62 which is the sliding member are inversed. Besides, the same symbols are attached to the portions identical to the portions in the first embodiment.

Raised bead portions 63 are guide raised portions each of which is raised in the upward direction, which are formed on both sides of the second telescopic guide hole 13 formed in the bottom bracket 61, which extend parallel to the second telescopic guide hole 13, and each of which has an arc section, as shown in FIG. 11. On the other hand, the slider 62 is superimposed on the bottom bracket 61. The slider 62 includes guide grooves 65 which are formed on a lower surface of the slider 62 at positions corresponding to the raised beat portions 63 of the bottom bracket 61, and each of which is a groove portion having an arc section. Each of the raised bead portions 63 having the arc section has a radius of curvature which is greater than a radius of curvature of one of the guide grooves 65 having the arc section. With these, when the raised bead portions 63 and the guide grooves 65 are pressed and abutted on each other, the raised bead portions 63 and the guide grooves 65 are contacted on each other by the line contacts, like FIG. 6.

Accordingly, in the telescopic guide mechanism 52 according to the second embodiment, it is possible to attain the operations and the effects which are identical to those in the first embodiment.

Besides, in the first embodiment, the bottom bracket 41 including the second telescopic elongated hole 13 and the pair of the guide grooves 43 formed on the both sides of the second telescopic elongated hole 13 is fixed and welded on the lower wall portion 2a of the tilt bracket 2. However, the second telescopic elongated hole 13 and the pair of the guide grooves 43 formed on the both sides of the second telescopic elongated hole 13 may be directly formed in the lower wall portion 2a of the tilt bracket 2.

Moreover, in the first embodiment, the second telescopic elongated hole 13 and the guide grooves 43 formed on the both sides of the second telescopic elongated hole 13 are provided on the lower wall portion 2a side of the tilt bracket 2. The slider 42 of the sliding guide member 51 which is disposed between the lower wall portion 2a of the tilt bracket 2 and the bottom wall portion 19a of the front bracket 19 is supported on the bottom wall portion 19 side of the front bracket 19 through the washer 49 and the disc spring 48 shown in FIG. 9, the bolt 50 penetrating through the second telescopic elongated hole 13, and the nut 47 screwed on the bolt 50. However, these relative position relationships may be inversed.

That is, the second telescopic elongated hole 13 and the pair of the guide grooves 43 formed on the both sides of the second telescopic elongated hole 13 are provided to the bottom wall portion 19a side of the front bracket 19. The slider 42 disposed between the lower wall portion 2a of the tilt bracket 2 and the bottom wall portion 19a of the front bracket 19 is supported on the lower wall portion 2a side of the tilt bracket 2 through the washer 49, the disc spring 48, the bolt 50 penetrating through the second telescopic elongated hole 13, and the nut 47 screwed on the bolt 50. In this case, it is also possible to attain the operations and the effects which are identical to those in the above-described embodiments.

Moreover, the support configuration of the slider 42 of the sliding guide member 51 is not limited to the jointly tightening configuration in which the washer 49, the disc spring 48, the bolt 50, and the nut 47 are used. For example, in a case where the second telescopic elongated hole 13 is formed in one of the lower wall portion 2a of the tilt bracket 2 and the bottom wall portion 19a of the front bracket 19, and the sliding guide member 51 is formed in the other of the lower wall portion 2a of the tilt bracket 2 and the bottom wall portion 19a of the front bracket 19, the slider 42 is elastically sandwiched between the lower wall portion 2a of the tilt bracket 2 and the bottom wall portion 19a of the front bracket 19. In this case, it is possible to attain the desired object as long as at least a part of the member constituting the sliding guide member 51 is mounted in the second telescopic elongated hole 13.

In the present invention, the telescopic guide mechanism including the second telescopic elongated hole positioned on the front side of the vehicle is disposed on the lower wall portion side of the steering column.

In the present invention, A steering column device includes: a steering column; a vehicle body mounting bracket straddling the steering column; a tilt bracket which is rotatably supported through a tilt shaft on a front end portion of the vehicle body mounting bracket; the vehicle body mounting bracket including side walls which are formed at rear end portions of the vehicle body mounting bracket, and each of which includes a tilt elongated hole through which a cramping shaft of a lock mechanism is inserted, the steering column including a distance portion which is sandwiched between the side walls of the vehicle body mounting bracket, and which includes first telescopic elongated holes through which the clamping shaft is inserted, a lock mechanism which includes the clamping shaft, and which is arranged to lock or unlock a tilt operation and a telescopic operation of the steering column, the steering column including a bottom wall portion which is formed on a front side of the first telescopic elongated hole, and which confronts a lower wall portion of the tilt bracket, a telescopic guide mechanism disposed between the lower wall portion of the tilt bracket and the bottom wall portion of the steering column, the telescopic guide mechanism including a second telescopic elongated hole formed in one of the lower wall portion of the tilt bracket and the bottom wall portion of the steering column, and a sliding guide member which is provided to the other of the lower wall portion of the tilt bracket and the bottom wall portion of the steering column which does not include the second telescopic elongated hole, whose a portion confronts the second telescopic elongated hole, and which elastically sandwiches an edge portion of the second telescopic elongated hole in the upward and downward directions.

Moreover, the sliding guide member includes a sliding member disposed on one of a front surface and a back surface of the one of the lower wall portion of the tilt bracket and the bottom wall portion of the steering column which includes the second telescopic elongated hole, a washer and an elastic member disposed on the other of the front surface and the back surface of the one of the lower wall portion of the tilt bracket and the bottom wall portion of the steering column which includes the second telescopic elongated hole, and a tightening member which is inserted into the second telescopic elongated hole, and which tightens and fixes the one of the lower wall portion of the tilt bracket and the bottom wall portion of the steering column which includes the second telescopic elongated hole, the sliding member, the washer, and the elastic member.

Furthermore, the other of the lower wall portion of the tilt bracket and the bottom wall portion of the steering column which does not include the second telescopic elongated hole, the sliding member, the one of the lower wall portion of the tilt bracket and the bottom wall portion of the steering column which includes the second telescopic elongated hole, the washer, and the elastic member are tightened together by the tightening member.

Moreover, the one of the lower wall portion of the tilt bracket and the bottom wall portion of the steering column which includes the second telescopic elongated hole includes a surface on which the sliding member is abutted, which includes a guide groove or a guide raised portion having an arc section, and extending parallel to the second telescopic elongated hole; the sliding member includes a protruding portion or a groove portion which has an arc section, and which is engaged with the guide groove or the guide raised portion; and the protruding portion or the guide raised portion has a radius of curvature which is greater than a radius of curvature of the guide groove or the groove portion so that the protruding portion or the guide raised portion is contacted on the guide groove or the groove portion at two portions of the guide groove or the groove portion by line contacts.

Furthermore, the one of the lower wall portion of the tilt bracket and the bottom wall portion of the steering column which includes the second telescopic elongated hole includes the guide grooves or the guide raised portions which are formed on both sides of the second elongated hole, which are adjacent to the second elongated hole, each of which has an arc section, and which extend substantially parallel to each other; and the sliding member includes protruding portions or groove portions which are engaged with the guide grooves or the guide raised portions.

Accordingly, in the above described structure, the telescopic guide mechanism including the second telescopic elongated hole positioned on the front side of the vehicle is disposed on the lower wall portion side of the steering column. Accordingly, the gap in the upward and downward directions which is disadvantageous for the support rigidity and the generation of the vibration is eliminated.

In the above-described structure, it is possible to eliminate the gap in the upward and downward directions in the telescopic guide mechanism. Accordingly, the steering column device strengthens the input in the upward and downward directions to the steering column. Moreover, the support rigidity becomes higher. Furthermore, the steering column device strengthens the vibration. Consequently, the wobbles and the vibration are not generated.

In the above-described structure, the one of the wall portions and the sliding member of the telescopic guide mechanism, there are provided the guide grooves or the guide raised portions having the arc section, and the protruding portions and the groove portions having the arc section having large radius of the curvature. With this, the protruding portions or the guide raised portions are contacted on the guide grooves or the groove portions by the line contacts. With this, the gap or the wobble of the steering column in the upward and downward directions which are the tilt adjustment direction, and in the leftward and rightward directions are not generated. Accordingly, it is possible to further improve the support rigidity.

The entire contents of Japanese Patent Application No. 2016-72578 filed Mar. 31, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A steering column device comprising:
a steering column;
a vehicle body mounting bracket straddling the steering column;
a tilt bracket which is rotatably supported through a tilt shaft on a front end portion of the vehicle body mounting bracket;
the vehicle body mounting bracket including side walls which are formed at rear end portions of the vehicle body mounting bracket, and each of which includes a tilt elongated hole through which a cramping shaft of a lock mechanism is inserted,
the steering column including a distance portion which is sandwiched between the side walls of the vehicle body mounting bracket, and which includes first telescopic elongated holes through which the clamping shaft is inserted,
a lock mechanism which includes the clamping shaft, and which is arranged to lock or unlock a tilt operation and a telescopic operation of the steering column,
the steering column including a bottom wall portion which is formed on a front side of the first telescopic elongated hole, and which confronts a lower wall portion of the tilt bracket,
a telescopic guide mechanism disposed between the lower wall portion of the tilt bracket and the bottom wall portion of the steering column,
the telescopic guide mechanism including a second telescopic elongated hole formed in one of the lower wall portion of the tilt bracket and the bottom wall portion of the steering column, and a sliding guide member which is provided to the other of the lower wall portion of the tilt bracket and the bottom wall portion of the steering column which does not include the second telescopic elongated hole, whose a portion confronts the second telescopic elongated hole, and which elastically sandwiches an edge portion of the second telescopic elongated hole in the upward and downward directions.

2. The steering column device as claimed in claim 1, wherein the sliding guide member includes a sliding member disposed on one of a front surface and a back surface of the one of the lower wall portion of the tilt s bracket and the bottom wall portion of the steering column which includes the second telescopic elongated hole, a washer and an elastic member disposed on the other of the front surface and the back surface of the one of the lower wall portion of the tilt bracket and the bottom wall portion of the steering column which includes the second telescopic elongated hole, and a tightening member which is inserted into the second telescopic elongated hole, and which tightens and fixes the one of the lower wall portion of the tilt bracket and the bottom wall portion of the steering column which includes the second telescopic elongated hole, the sliding member, the washer, and the elastic member.

3. The steering column device as claimed in claim 2, wherein the other of the lower wall portion of the tilt bracket and the bottom wall portion of the steering column which does not include the second telescopic elongated hole, the sliding member, the one of the lower the lower wall portion of the tilt bracket and the bottom wall portion of the steering column which includes the second telescopic elongated hole, the washer, and the elastic member are tightened together by the tightening member.

4. The steering column device as claimed in claim 2, wherein the one of the lower wall portion of the tilt bracket and the bottom wall portion of the steering column which includes the second telescopic elongated hole includes a surface on which the sliding member is abutted, which includes a guide groove or a guide raised portion having an arc section, and extending parallel to the second telescopic elongated hole; the sliding member includes a protruding portion or a groove portion which has an arc section, and which is engaged with the guide groove or the guide raised portion; and the protruding portion or the guide raised portion has a radius of curvature which is greater than a radius of curvature of the guide groove or the groove portion so that the protruding portion or the guide raised portion is contacted on the guide groove or the groove portion at two portions of the guide groove or the groove portion by line contacts.

5. The steering column device as claimed in claim 4, wherein the one of the lower wall portion of the tilt bracket and the bottom wall portion of the steering column which includes the second telescopic elongated hole includes the guide grooves or the guide raised portions which are formed on both sides of the second elongated hole, which are adjacent to the second elongated hole, each of which has an arc section, and which extend substantially parallel to each other; and the sliding member includes protruding portions or groove portions which are engaged with the guide grooves or the guide raised portions.

* * * * *